(12) United States Patent
Iyer et al.

(10) Patent No.: US 11,197,124 B2
(45) Date of Patent: Dec. 7, 2021

(54) ALERT GENERATION BASED ON DISTANCE BETWEEN TWO WIRELESSLY CONNECTED ELECTRONIC DEVICES

(71) Applicant: Dell Products L.P., Round Rock, TX (US)

(72) Inventors: Vivek Viswanathan Iyer, Austin, TX (US); Karthikeyan Krishnakumar, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 16/738,633

(22) Filed: Jan. 9, 2020

(65) Prior Publication Data
US 2021/0219095 A1    Jul. 15, 2021

(51) Int. Cl.
| | |
|---|---|
| *H04W 4/02* | (2018.01) |
| *H04W 4/80* | (2018.01) |
| *G08B 21/18* | (2006.01) |
| *G08B 21/02* | (2006.01) |
| *G08B 21/24* | (2006.01) |

(52) U.S. Cl.
CPC ......... *H04W 4/023* (2013.01); *G08B 21/023* (2013.01); *G08B 21/182* (2013.01); *G08B 21/24* (2013.01); *H04W 4/80* (2018.02); *G08B 21/0247* (2013.01); *G08B 21/0277* (2013.01)

(58) Field of Classification Search
CPC ............... G08B 21/24; G08B 21/0227; G08B 21/0277; G08B 13/1427; H04W 4/80; H04W 4/023
See application file for complete search history.

(56) References Cited

U.S. PATENT DOCUMENTS

| | | | | |
|---|---|---|---|---|
| 6,353,390 | B1 * | 3/2002 | Beri ................... | G08B 13/1427 340/572.1 |
| 2013/0005354 | A1 * | 1/2013 | Sheilendra ............ | H04W 4/029 455/456.1 |
| 2014/0004799 | A1 * | 1/2014 | Masuda ............ | H04W 52/0225 455/41.2 |
| 2016/0035213 | A1 * | 2/2016 | Choi ................... | H04W 72/048 340/669 |
| 2018/0020329 | A1 * | 1/2018 | Smith ................... | H04W 4/026 |
| 2019/0069243 | A1 * | 2/2019 | Bean ......................... | G06F 1/28 |
| 2019/0251561 | A1 * | 8/2019 | Oosthuizen ........ | G06Q 20/4014 |
| 2019/0378391 | A1 * | 12/2019 | Miniard ................ | G06Q 10/10 |
| 2020/0177722 | A1 * | 6/2020 | Janugani ............. | H04N 21/478 |

* cited by examiner

*Primary Examiner* — Nam T Huynh
(74) *Attorney, Agent, or Firm* — Norton Rose Fulbright US LLP

(57) ABSTRACT

A first electronic device may determine that a distance between the first electronic device and second electronic device has exceeded a threshold distance. The first electronic device may determine whether movement of the first electronic device or movement of the second electronic device caused the distance to exceed the distance threshold. Based upon the determination of whether movement of the first electronic device or movement of the second electronic device caused the threshold to be exceeded, the first electronic device may generate one or more alert notifications to notify the user that the distance has exceeded the threshold.

19 Claims, 6 Drawing Sheets

ALERT GENERATION BASED ON DISTANCE BETWEEN TWO WIRELESSLY CONNECTED ELECTRONIC DEVICES

FIELD OF THE DISCLOSURE

The instant disclosure relates to distance measurement between electronic devices. More specifically, portions of this disclosure relate to alert generation based on distances between wirelessly connected electronic devices.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Users may connect a multitude of different kinds of peripherals to information handling systems. Some of these peripherals may be connected wirelessly. For example, wireless keyboards, mice, headphones, headsets, speakers, displays, data storage devices, smart watches, smart glasses, webcams, smart pens, and other peripherals may be wirelessly connected to information handling systems. Information handling systems may also connect wirelessly to each other. For example, cell phones, tablets, televisions, desktops, laptops, or other information handling system may connect wirelessly to each other.

One problem that may arise with the use of numerous peripheral devices is that users may forget one or more peripherals when moving to a new location. This problem is particularly prevalent with use of wireless peripherals. For example, a user may use a wireless mouse and a smart pen with a laptop computer. When a user is ready to pack up and move to a new location, the user may forget the smart pen or wireless mouse as neither the smart pen nor the wireless mouse is wired to the information handling system. Often, a substantial period of time may pass before the user notices that a wireless peripheral is missing. In some cases, the device may be locatable through an internet or cellular connection enabling the user to determine where the device is located, but the user will still be required to travel to the previous location in order to retrieve the device. Forgotten or misplaced peripherals are an inconvenience to a user.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

An electronic device, such as an information handling system may monitor a distance between the electronic device and one or more connected electronic devices, such as peripheral devices. When a distance between the first electronic device and one or more of the connected electronic devices exceeds a predetermined distance threshold, the first electronic device may alert a user that the distance has exceeded the threshold. The first electronic device may determine which connected electronic device was moved by the user causing the threshold to be exceeded and may alert the user based on the determination. For example, when a user places a laptop computer in a backpack and moves the laptop more than a predetermined distance from a wireless mouse connected to the computer, the computer may detect that the distance threshold has been exceeded and may notify the user, such as by an audio or visual cue emitted by the information handling system or another device, that the mouse has been left behind. Such notifications may help to notify users if they forget wireless peripherals and/or information handling systems and may help to prevent peripheral loss. Furthermore, such distance monitoring can also be used to enhance security, such as by logging out of a system when movement of a connected peripheral or information handling system indicates that a user has moved away from an information handling system or secure peripheral.

When a user separates two electronic devices by more than a threshold distance, the information handling system may notify the user. An example method of notifying a user that a distance threshold has been exceeded may begin with determining, by a first electronic device, that a distance between the first electronic device and the second electronic device has exceeded a distance threshold. Electronic devices may include information handling systems and peripheral devices. For example, an information handling system may determine that a distance between an information handling system and a peripheral device has exceeded a distance threshold. For example, two electronic devices, such as an information handling system and a peripheral device, may be connected via a Bluetooth connection, such as a Bluetooth low energy (LE) connection, which may be used to measure a distance between the two devices. The first electronic device may periodically or continuously monitor the distance between the first electronic device and the second electronic device to detect when distance between the two exceeds the distance threshold. The distance threshold may be configurable by the user and may differ from device to device. For example, user input specifying a distance threshold may be received, and the distance threshold may be established and/or adjusted based on the received user input. Determining that the distance threshold has been exceeded may be performed while the information handling system is in a standby state, such as a modern standby state. The modern standby state may, for example, be a sleep mode.

When the distance exceeds the threshold, the first electronic device may determine whether movement of the first electronic device or the second electronic device caused the distance to exceed the threshold. For example, the first electronic device may determine whether movement of the first electronic device or movement of the second electronic device caused the distance to exceed the distance threshold based on an analysis of received motion data received from an accelerometer of at least one of the first electronic device and the second electronic device. If motion data from an accelerometer of the first electronic device shows that the first electronic device was moved, the first electronic device may determine that movement of the first electronic device caused the threshold to be exceeded. If motion data from an accelerometer of the first electronic device shows that the first electronic device was not moved, the first electronic device may determine that movement of the second electronic device caused the threshold to be exceeded.

When the first electronic device has determined that the distance threshold has been exceeded and has determined which of the devices was moved and caused the threshold to be exceeded, the first electronic device may generate a user alert based, at least in part, on the determination of whether movement of the first electronic device or the second electronic device caused the distance to exceed the distance threshold. The alert may be made to the user via the first electronic device, the second electronic device, or another electronic device. For example, an information handling system may determine that a peripheral device was moved by a user causing the threshold to be exceeded, and that the peripheral device is likely in possession of the user, and may generate an alert, such as an audio or visual cue, to be delivered to the user from the peripheral device. In some embodiments, for example, an audible tone may be generated by the first electronic device or the second electronic device. The audible tone may increase in volume as the distance between the first electronic device and the second electronic device increases beyond the threshold.

In some embodiments, the first electronic device may determine a velocity of movement of either the first electronic device or the second electronic device. For example, the velocity of movement may be determined based on accelerometer data from the first electronic device or the second electronic device or based on a change in distance over time between the first electronic device and the second electronic device. The velocity of movement of either the first electronic device or the second electronic device may be used to determine an urgency for the alert. In some embodiments, generation of the alert may be further based, at least in part, on the urgency of the alert. For example, if a peripheral device is moving away from an information handling system at a velocity greater than a threshold velocity, the information handling system may determine that an alert has high urgency and may generate one or more alerts based on the high urgency, such as a loud sound or a text message. If the peripheral device is moving away from the information handling system at a velocity lower than a threshold velocity, the information handling system may determine that an alert has low urgency and may generate one or more alerts based on the low urgency, such as displaying a message on a display or causing an LED to activate.

An electronic device, such as an information handling system, may include a memory and a processor for performing the steps described herein. The electronic device may also include a Bluetooth module and an accelerometer. Instructions for performing the steps described herein may be stored on a non-transitory computer readable medium.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
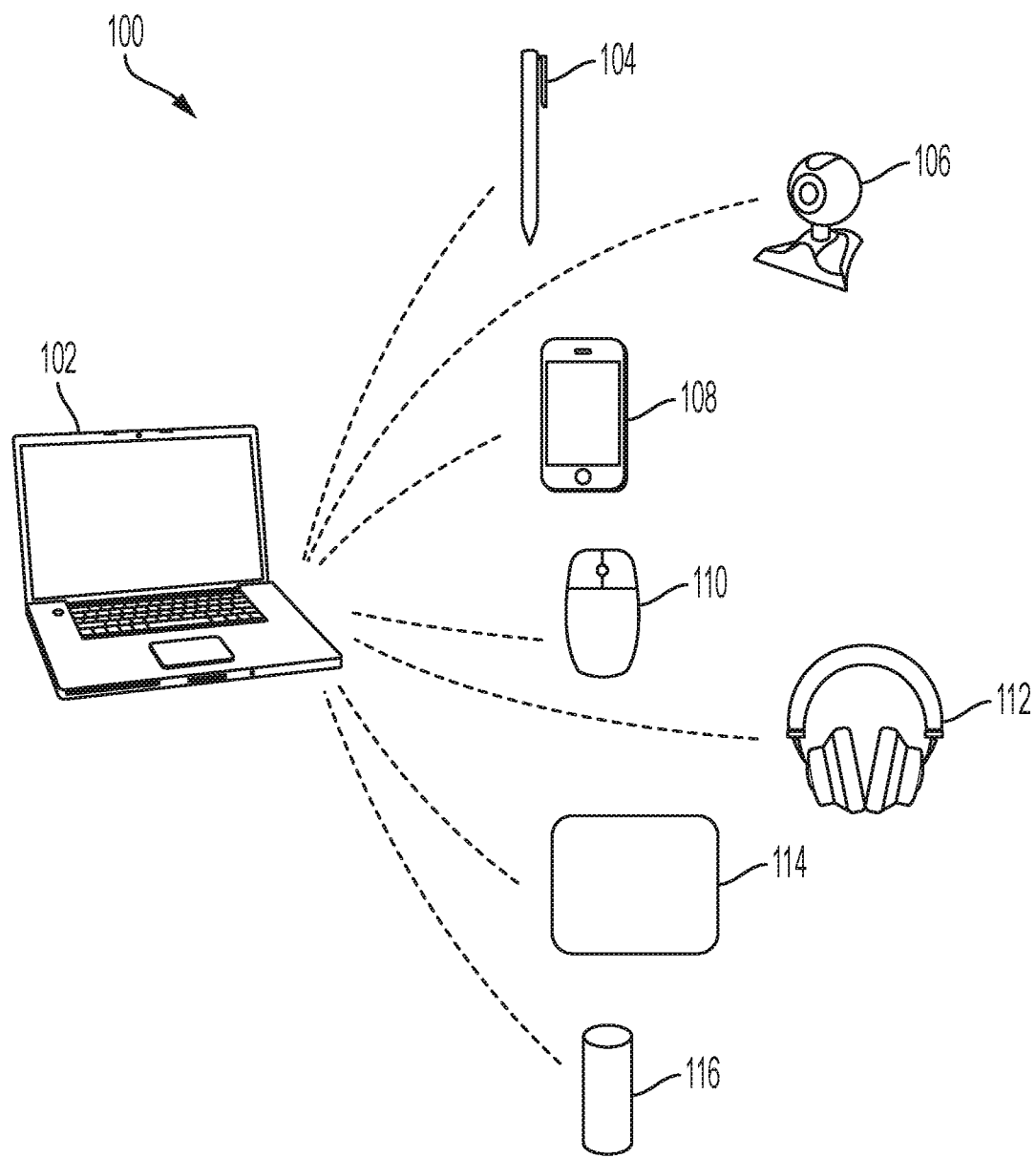
FIG. 1 is a diagram of an example information handling system connected to multiple electronic devices according to some embodiments of the disclosure.

Users may connect information handling systems to a variety of peripheral devices to expand their functionality. Peripheral devices may be connected to information handling systems via wired connections, such as universal serial bus (USB) and USB-C, and via wireless connections, such as Bluetooth, Bluetooth LE, Wi-Fi, and other wireless connections. As shown in the example system 100 of FIG. 1, an information handling system 102 may be wirelessly connected to many peripheral devices. For example, an information handling system 102 may be wirelessly connected to a smart pen 104, a webcam 106, a wireless mouse 110, wireless headphones 112, a wireless hard drive or solid state drive 114, a wireless speaker 116, and other wireless peripheral devices. Information handling systems may also connect to other electronic devices wirelessly, such as a smart phone 108 and other information handling systems. As the devices are not wired to the information handling system, a user may, without noticing, leave one or more devices behind when leaving a location with the information handling system. The devices 104-116 may be wirelessly connected to the information handling system via a wireless connection, such as a Bluetooth LE connection, which may allow the information handling system to determine a distance between the information handling system 102 and each of the devices 104-116.

Figure 2:
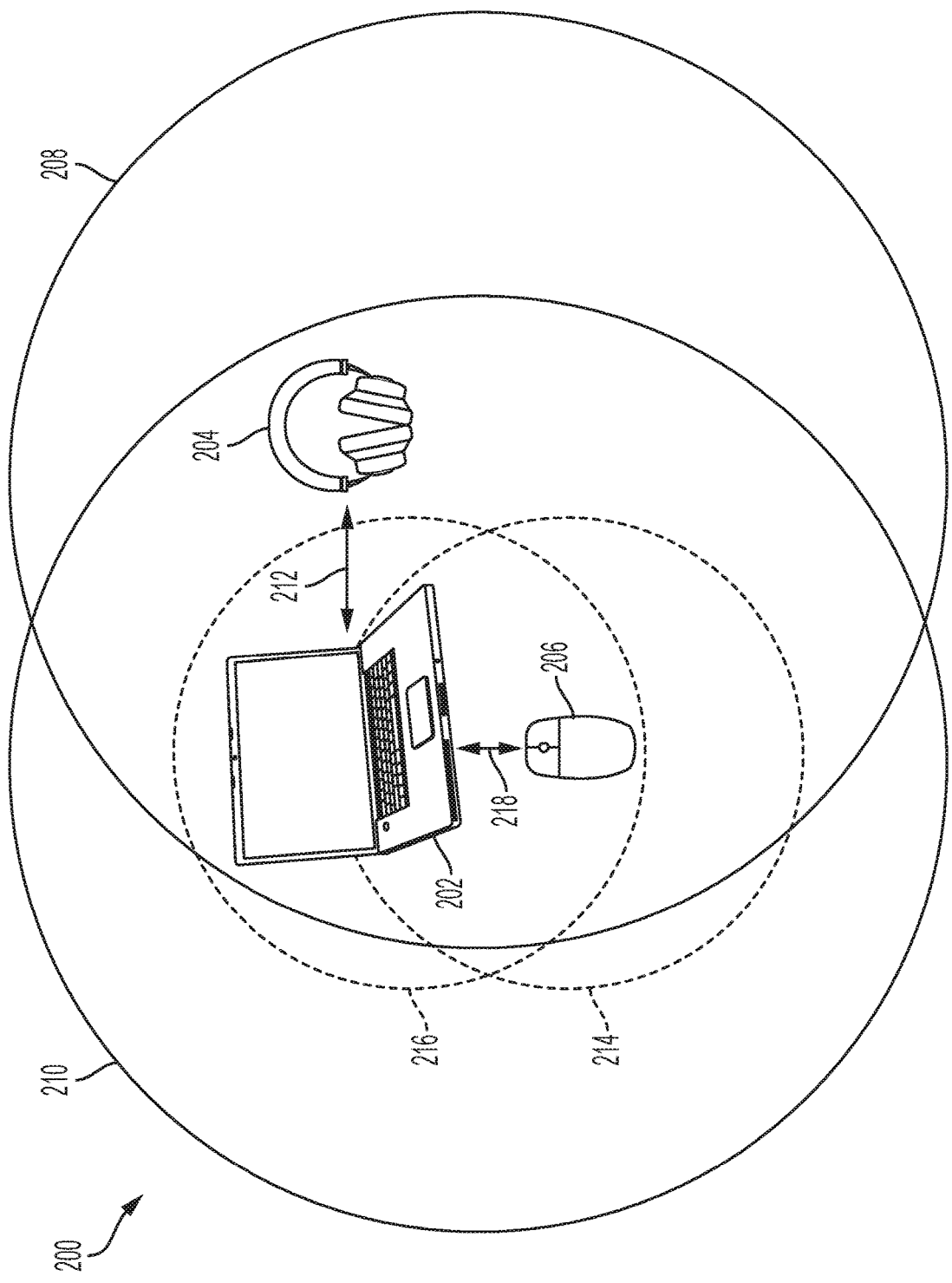
FIG. 2 is a diagram of an information handling system connected to two peripheral devices, each peripheral device assigned a different threshold distance for alert triggering, according to some embodiments of the disclosure.

Alerts may be generated when a distance between a connected peripheral device and an information handling system exceeds a predetermined threshold. An example system 200 including an information handling system 202, wireless headphones 204, and a wireless mouse 206 is shown in FIG. 2. The information handling system 202 may be wirelessly connected to the headphones 204. A threshold distance may be set between the information handling system 202 and the headphones 204. If the information handling system is moved outside of threshold 208 from the headphones 204, the threshold distance will be exceeded, and if the headphones 204 are moved outside of threshold 210 of the information handling system 202 the threshold distance will be exceeded. For example, the headphones 204 are within a threshold 210 of the information handling system 202, and the information handling system 202 is within a threshold 208 of the headphones 204. Thus, the threshold distance between the information handling system 202 and the headphones 204 has not been exceeded. Thus, the distance 212 between the information handling system 202 and the headphones 204 is within the threshold distance. If the headphones 204 are moved beyond the threshold 210, or the information handling system is moved beyond the threshold 208, the distance between the headphones 204 and information handling system 202 will have exceeded the threshold distance. The information handling system 202 may, for example, use a Bluetooth LE connection between the information handling system 202 and the headphones 204 to determine the distance 212 between the information handling system 202 and the headphones 204.

Different threshold distances may be assigned to different peripheral devices and may be configurable by a user. For example, a threshold distance for a wireless mouse 206 may be less than the threshold distance for the headphones 204, as a user may generally keep the wireless mouse 206 closer to the information handling system 202 than the headphones 204. Thus, if the information handling system 202 is within a threshold 214 of the wireless mouse 206 and the wireless mouse 206 is within a threshold 216 of the information handling system 202 the distance 218 between the information handling system 202 and the wireless mouse 206 may be within a threshold distance. If the wireless mouse 206 is moved beyond the threshold 216, or the information handling system 202 is moved beyond the threshold 214, a user alert may be triggered. The threshold distance between the information handling system 202 and the headphones 204 may, for example, be eight feet, while the threshold between the information handling system 202 and the mouse 204 may be two feet. Thus, thresholds 208, 210 may have a radius of eight feet, and thresholds 216, 214 may have a radius of two feet. The threshold distances may be configurable by a user to allow distances to be tailored to user preferences. The information handling system 202 may use a Bluetooth LE connection between the information handling system 202 and the mouse 206 to determine the distance 218 between the information handling system 202 and the mouse 206.

Figure 3:
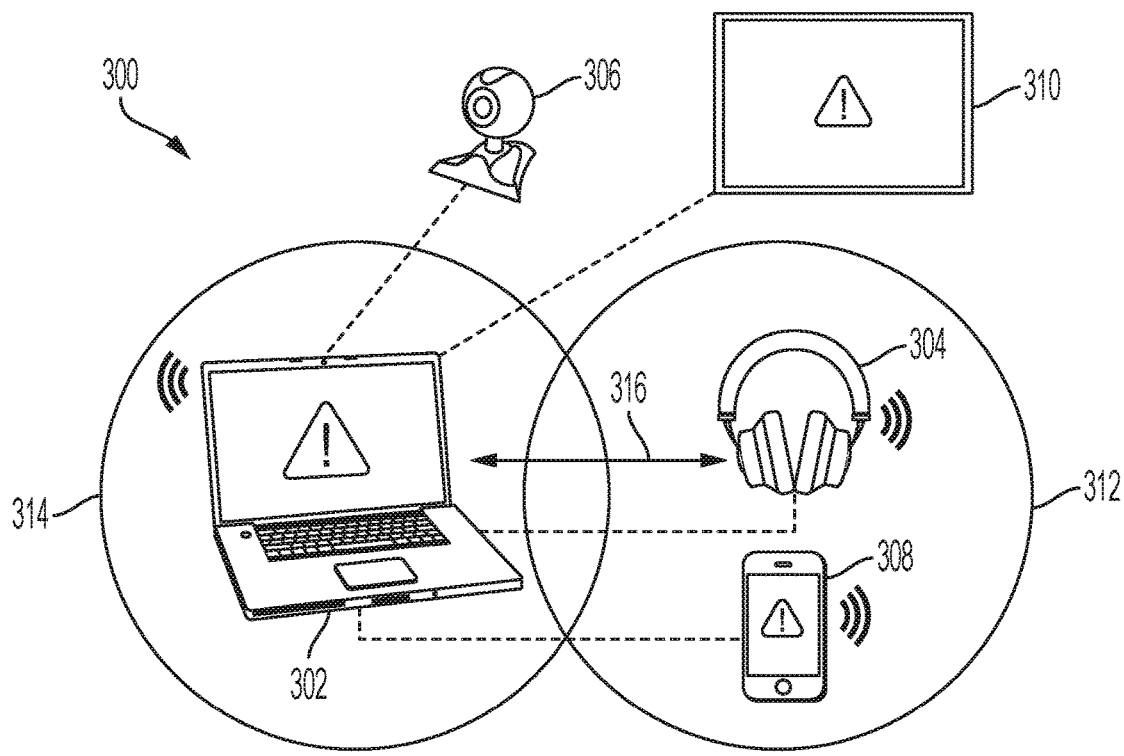
FIG. 3 is a diagram of an information handling system connected to several peripheral devices where a distance between the information handling system and a peripheral device exceeds a threshold distance according to some embodiments of the disclosure.

When an information handling system or peripheral device is moved beyond a threshold distance of a connected peripheral device or information handling system, the information handling system may trigger an alert. An example system 300, shown in FIG. 3, may include an information handling system 302 and headphones 304. For example, the headphones 204 of FIG. 2 may be moved beyond the threshold 210, such that the distance 216 between the information handling system 202 and the headphones 204 exceeds a threshold distance. For example, as shown in FIG. 3, the headphones 304 are beyond a threshold 314 of the information handling system 302, such that the distance 316 has exceeded a threshold distance. Alternatively, the information handling system 302 may have been moved beyond a threshold 312 of the headphones 304, such that the distance 316 has exceeded a threshold distance. When either the headphones 304 or the information handling system 302 are moved such that the distance 316 exceeds a threshold distance, the information handling system 302 may detect that the threshold distance has been exceeded and may trigger one or more alerts.

The information handling system 302 may determine whether movement of the headphones 304 or the information handling system 302 caused the distance threshold to be exceeded. For example, the information handling system 302 may determine that movement of the headphones 304 caused the distance threshold to be exceeded based on data from an accelerometer of the information handling system 302 showing a lack of movement of the information handling system 302 or based on data received from an accelerometer of the headphones 304 showing movement. The information handling system 302 may determine that movement of the information handling system 304 caused the distance threshold to be exceeded based on data from an accelerometer of the information handling system 302 showing movement of the information handling system 302.

The information handling system 302 may trigger different alerts based on whether movement of the information handling system 302 or the headphones 304 caused the distance threshold to be exceeded. For example, if movement of the headphones 304 caused the distance 316 to exceed the distance threshold, the information handling system 302 may assume that the headphones are in possession of the user and may trigger an audio or visual alert on the headphones 304. For example, the information handling system 302 may cause the headphones 304 to emit a tone alerting the user that the information handling system has been left behind. The information handling system 302 may cause the volume of the tone to increase as the distance 316 increases beyond the threshold distance. In some embodiments, the information handling system 302 may take other action, such as entering a secure mode, when it determines that the headphones 304 have been moved more than a threshold distance from the information handling system 302. In some embodiments, the information handling system may be connected to a data storage device, such as data storage device 114 and may cause the data storage device 114 to enter a secure mode if a distance between the secure device and the information handling system exceeds a distance threshold. In some embodiments, the information handling system may similarly cause a cell phone to enter a secure mode if a threshold distance is exceeded. In some embodiments, the information handling system may transmit a message to a server to revoke a security certificate or credential for either the information handling system or a connected electronic device, such as a connected information handling system, revoking access to certain data by the information handling system or the connected device, such as to a corporate mail account. If movement of the information handling system 302 caused the distance 316 to exceed the threshold distance, the information handling system 302 may emit an audio alert or display a visual alert. For example, a speaker of the information handling system 302 may emit an audio tone that may increase in volume as the distance 316 increases.

The information handling system 302 may cause alerts to appear on other devices, when the threshold distance is exceeded. For example, the information handling system 302 may also be connected to a webcam 306 or other camera, a smart phone 308, and/or a display 310, such as a television. In some embodiments, the information handling system 302 may generate an alert on itself and all connected devices. In some embodiments, the information handling system 302 may determine a device to use to alert a user and a type of alert based on data received from other peripheral devices. For example, if a user is leaving the information handling system 302 behind, while carrying headphones 304, the information handling system may determine, based on video data received from the webcam 306, that the user is looking at the display 310, and may display a visual alert on the display 310 informing the user that the information handling system 302 has been left behind. Alternatively, the information handling system 302 may determine that a user is looking at the smartphone 308 and may display an alert on the smartphone 308 or cause the smartphone 308 to emit an audio alert. Thus, an information handling system 302 may use data received from a variety of devices to determine an alert that is most likely to catch a user's attention and may cause a device to display or emit such an alert based on the determination. The alerts that are displayed or emitted may be configurable by a user. For example, the information handling system 302 may allow a user to determine a device on which to display or emit an alert and a type of alert to be displayed or emitted when a user removes the headphones 304 from within a distance threshold of the information handling system 302.

Figure 4:
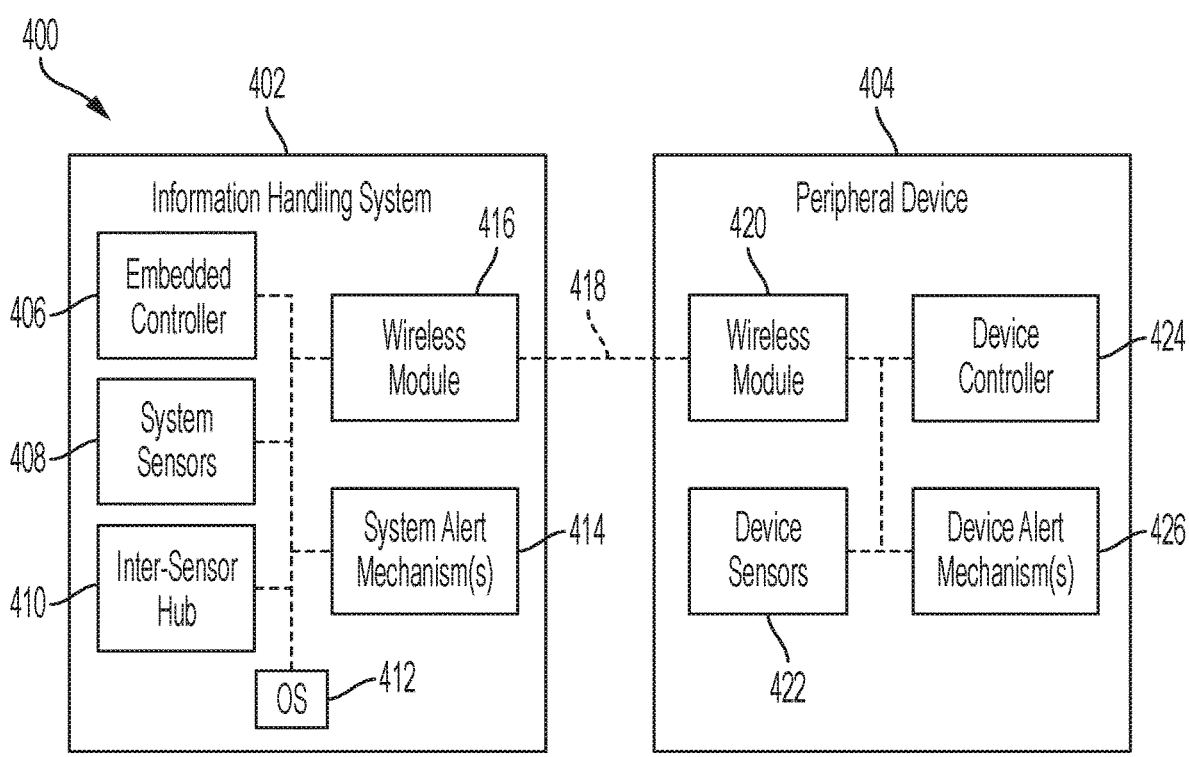
FIG. 4 is a block diagram of an information handling system connected to a peripheral device according to some embodiments of the disclosure.

A system 400 for connecting an information handling system 402 to a peripheral device 404 is shown in FIG. 4. An information handling system 402 may, for example, include a wireless module 416 for connecting via a wireless connection 418 to a wireless module 420 of a peripheral device 404. The wireless modules 416, 420 may, for example, be Bluetooth modules, such as Bluetooth LE modules. For example, the peripheral device 404 may be wirelessly tethered or leashed to the information handling system 402 via a Bluetooth LE connection.

The information handling system 402 may include multiple system sensors 408. For example, the system sensors 408 may include an accelerometer, a gyroscope, a light sensor, and other sensors. The system sensors may communicate with an inter-sensor hub 410. In some embodiments, the inter-sensor hub 410 may control the sensors, may receive and store sensor data from the sensors 408, and may store configuration data for the sensors 408. The information handling system 414 may also include one or more system alert mechanisms 414. For example, the system alert mechanisms 414 may include a display that may display an alert to a user, one or more speakers that may emit one or more audio tones to alert a user, LEDs or other light sources that may be activated to alert a user, a haptic feedback mechanism to alert a user, and other alert mechanisms. The information handling system 402 may include an embedded controller 406 that may control the system sensors 408 and the inter-sensor hub 410. In some embodiments, the embedded controller 406 may also communicate with and/or control the wireless module 416 and the system alert mechanisms 414. The information handling system 402 may also include an operating system (OS) 412. A software service of the OS 412 may allow the user to configure distance thresholds and other alert notification parameters, such as by setting a range for a specific peripheral device and a type of alert the user would like generated when the distance between the information handling system 402 and the peripheral device 404 exceeds the threshold. In some embodiments, if the information handling system 402 is in a modern standby state, such as a sleep mode, the embedded controller 406 may detect that a distance between the information handling system and the peripheral device 404 has exceeded a distance threshold and may determine which of the information handling system 402 and the peripheral device 404 was moved to cause the threshold to be exceeded. Based on the determination that the threshold has been exceeded and, in some embodiments, the determination of which of the information handling system and the peripheral device has been moved to cause the threshold to be exceeded, the embedded controller 406 may communicate with the OS 412 to wake the information handling system 402 to either notify the user via system alert mechanisms 414 that the threshold has been exceeded or to instruct the peripheral device 404 to alert the user.

The peripheral device 404 may include a device controller 424 to control the device. The peripheral device may also include one or more device sensors 422, such as include an accelerometer, a gyroscope, a light sensor, and other sensors. The sensors 422 may be used to determine if movement of the peripheral device 404 caused the threshold to be exceeded. In some embodiments, the wireless module 420 of the peripheral device 404 may transmit sensor data from the device sensors 422 to the information handling system 402. The peripheral device 404 may also include one or more device alert mechanisms 426, such as include a display that may display an alert to a user, one or more speakers that may emit one or more audio tones to alert a user, LEDs or other light sources that may be activated to alert a user, a haptic feedback mechanism to alert a user, and other alert mechanisms, which may be used to alert a user when a distance threshold has been exceeded. The peripheral device 404 may also include a device controller 424 to control the device 404. For example, the device controller 424 may receive instructions from the information handling system 402 instructing the peripheral device 404 to activate one or more device alert mechanisms 426 when the information handling system 402 determines that a distance between the information handling system 402 and the peripheral device 404 has exceeded a threshold. In some embodiments, instructions to alert a user may be transmitted from the information handling system 402 to the peripheral device 404 via the wireless modules 416, 420 when the information handling system 402 determines that movement of the peripheral device 404 likely caused the distance threshold to be exceeded and that the peripheral device 404 is therefore in possession of the user. For example, the information handling system 402 may instruct the peripheral device 404 to emit one or more tones via a speaker of the device alert mechanisms 426. Thus, an information handling system 402 and a peripheral device 404 may communicate with each other to alert a user when a distance between the two has exceeded a threshold distance.

Some information handling systems may enter a modern standby state, such as a sleep mode. For example, when a user closes a laptop computer, the laptop may enter a modern standby state. In the modern standby state the information handling system may deactivate a number of components. Even when in a modern standby state, an information handling system may monitor a distance between the information handling system and one or more peripheral devices in order to detect when a distance between the information handling system and one or more peripheral devices exceeds a distance threshold. An OS 502, embedded controller (EC) 504, and an inter-sensor hub (ISH) 506 may communicate with each other to detect when a distance between an information handling system and a peripheral device exceeds a threshold distance, while in a modern standby state, as shown in the process flow diagram 500 of FIG. 5. At step 508, the OS 502 may receive configuration information. In some embodiments, configuration information, such as distance thresholds for particular peripherals, alerts that should be triggered when particular peripherals exceed distance thresholds, and alerts that should be triggered based on whether a particular threshold is exceeded by movement of an information handling system or movement of the peripheral device, may be entered manually by a user, may be determined automatically, or may be configured by a service professional or system administrator. The configuration information may also include a list of peripheral devices for range tracking. At step 510, the OS 502 may enter a standby state, such as a modern standby state. This may occur at some point after the configuration information is received at step 508. In the modern standby state, a wireless connection, such as a Bluetooth LE connection, between the information handling system and the peripheral device may be maintained and sensors and an EC 504 may remain active, while other components of the information handling system are deactivated. The EC 504 may, for example, comprise a root of trust and may be running on a platform controller hub of the information handling system. For example, the EC 504 may be connected to a main power rail of the information handling system and may be always on.

At step 512, the EC 504 may load configuration information from the OS 500. The EC 504 may transmit the configuration information to the ISH 506, and the ISH 506 may, at step 514, store configuration information. The ISH 506 may receive sensor configuration information from the EC 504 and may store the sensor configuration information in a non-volatile memory, such as a non-volatile random-access memory. The configuration information may instruct the ISH 506 of a frequency at which the EC 504 should receive sensor information or events that should trigger transmission of sensor information to the EC 504. At step 516, the EC 504 may receive range information. For example, the EC 504 may measure a range between the information handling system and a peripheral device via a wireless connection to the peripheral device, such as a Bluetooth LE connection. In some cases, the EC 504 may communicate with a wireless communication module, such as a Bluetooth LE module, to receive range information. In some embodiments, the EC 504 may determine the range between the information handling system and peripheral devices less frequently when the OS 502 is in the modern standby state. Such infrequent monitoring may occur for a predetermined period of time or until the information handling system exits the modern standby state. In some embodiments, the infrequent monitoring may extend until the earlier of the passage of the predetermined period of time or the system exiting the modern standby state.

At step 518, the ISH 506 may transmit sensor information to the EC 504. For example, the ISH 506 may receive and store sensor information from one or more sensors, such an accelerometer, a gyroscope, a light sensor, a user presence detection (UPD) sensor, such as a proximity sensor, pressure sensor, or camera, an eye gaze tracking (EGT) sensor, such as a camera, or other sensors. The sensor information transmitted by the ISH 506 may include sensor information indicating whether the information handling system has been moved. In some embodiments, the EC 504 may request sensor information from the ISH 506 when it determines that the distance between the information handling system and the peripheral device has exceeded the threshold. In some embodiments, a threshold may be set at the ISH 506 and sensor information may be transmitted to the EC 504 when sensor information exceeds the threshold. For example, if motion of the information handling system sensed by an accelerometer exceeds the threshold, the ISH 506 may transmit motion data to the EC 504. The threshold may be configured by a user.

At step 520, the EC 504 may receive the sensor information from the ISH 506. At step 522, the EC 504 may determine that a distance between the information handling system and a peripheral device has exceeded a distance threshold. For example, the embedded controller 504 may compare range information received at step 516 for a peripheral device with a distance threshold for the peripheral device that was loaded at step 512 and may determine that the distance between the peripheral device and the information handling system has exceeded the threshold. In some embodiments the EC 504 may also determine whether motion of the information handling system has exceeded a motion threshold based on data received from the ISH 506. In some embodiments, the embedded controller 504 may then, at step 524, alert the OS 502 that the distance threshold has been exceeded. At step 526, the OS 502 may wake and trigger one or more notifications. For example, the OS 502 may exit the standby state and may display a visual notification, emit an audio notification, or may transmit an instruction to another device to display a visual or emit an audio notification. In some embodiments, the EC 504 may perform a host embedded controller interface write or Windows management interface write to a listening OS service to wake the OS 502.

Figure 6:
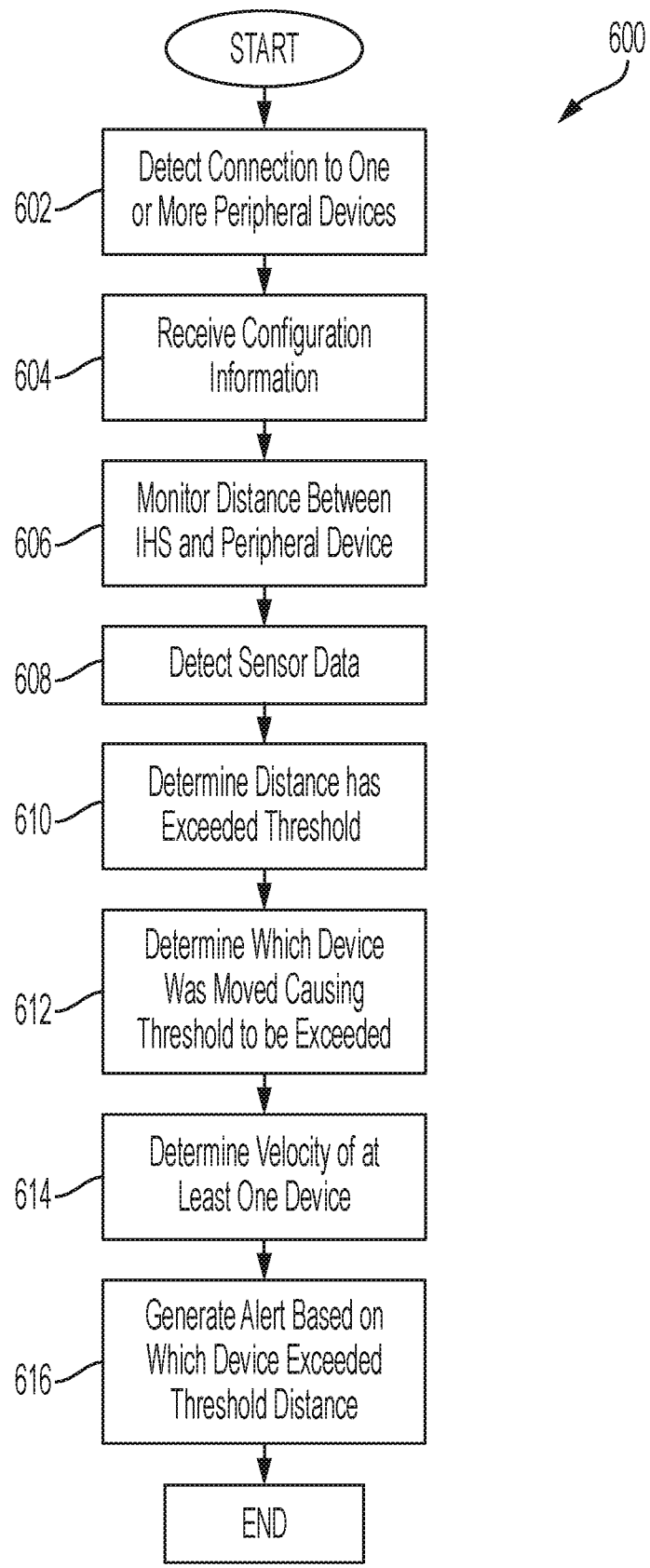
FIG. 6 is a flow chart of an example method for alerting a user when a distance between a peripheral device and an information handling system has exceeded a threshold distance according to some embodiments of the disclosure.

An information handling system may alert a user when a distance between the information handling system and a peripheral device exceeds a threshold distance. A method 600 for alerting a user when a distance between an information handling system and a peripheral device exceeds a threshold distance is shown in FIG. 6. The method 600 may begin, at step 602, with detecting a connection of one or more peripheral devices to an information handling system. For example, an information handling system may be wirelessly connected to multiple peripheral devices, such as wireless speakers, headphones, headsets, dongles, mice, keyboards, storage devices, smart pens, smart phones, displays, webcams, and other devices. The information handling system may be connected to such peripheral devices via a Wi-Fi connection, Bluetooth connection, such as a Bluetooth LE connection, or other wireless connection.

At step 604, the information handling system may receive configuration information. For example, the information handling system may receive configuration information detailing threshold distances for one or more peripheral devices, detailing one or more distance thresholds at which user alerts will be triggered. The configuration information may also include information detailing specific alerts that should be generated when specific peripheral devices exceed threshold distances. For example, the information handling system may receive input specifying a distance threshold of eight feet for wirelessly connected headphones and a user alert of an audio chime when the headphones are moved more than eight feet from the information handling system. Different thresholds may be set for different peripheral devices. Likewise, different alerts may be set for different peripheral devices as well. Alerts may also be customized based on whether movement of the information handling system or the peripheral caused the distance threshold to be exceeded. The configuration information may be entered manually by a user, determined automatically, or entered by a service professional or system administrator.

At step 606, the information handling system may monitor a distance between the information handling system and one or more peripheral devices. For example, the information handling system may monitor the distance between the information handling system and the peripheral devices using a wireless connection, such as a Bluetooth LE connection, between the information handling system and the wireless devices. For example, the information handling system may determine an angle of arrival and/or angle of departure of signals from a peripheral device as well as a range or distance between the information handling system and the peripheral device using the Bluetooth LE connection. The Bluetooth LE connection may, for example, be a Bluetooth LE 5.2 connection. The information handling system may use this information to create a tether between the information handling system and one or more peripheral devices.

At step 608, the information handling system may detect sensor data. For example, the information handling system may detect sensor data from sensors of the information handling system itself or may receive sensor data from one or more peripheral devices. The information handling system may include one or more sensors such as an accelerometer, a gyroscope, a light sensor, a microphone, and other sensors. The information handling system may receive sensor data from the sensors, such as motion data from the accelerometer. A peripheral device may also include one or more sensors, such as an accelerometer, a gyroscope, a light sensor, and other sensors, and may transmit sensor data to the information handling system. For example, the peripheral device may transmit sensor data from a sensor, such as an accelerometer, to the information handling system.

At step 610, the information handling system may determine that a distance threshold has been exceeded. For example, the information handling system may use a wireless connection, such as a Bluetooth LE connection, to a peripheral device to measure a distance between the peripheral device and the information handling system. The information handling system may then compare the distance to a distance threshold assigned to the peripheral device. If the measured distance is greater than a distance threshold, the information handling system may determine that a distance between the information handling system and the peripheral device has exceeded the threshold.

At step 612, the information handling system may determine which device was moved to cause the distance between the devices to exceed the threshold. The information handling system may use sensor data detected at step 608 in making such a determination. For example, the information handling system may determine based on accelerometer data received from a sensor of the information handling system that the information handling system has been moved. Alternatively, the information handling system may determine based on accelerometer data received from a sensor of the information handling system that the information handling system has not been moved and may determine, by extension, that the peripheral device has been moved. In another scenario, the information handling system may determine based on accelerometer data received from the peripheral device that the peripheral device has been moved. In some embodiments, the information handling system may determine whether the information handling system or peripheral device was moved based on data received from other peripheral devices. For example, the information handling system may determine based on video data received from a webcam that headphones were moved away from the information handling system causing the distance threshold to be exceeded.

In some embodiments, the information handling system may, at step 614, determine a velocity of either the information handling system or the peripheral device. In some embodiments, the velocity determination may be made upon a determination that a distance threshold has been exceeded. For example, the information handling system may determine velocity of either the information handling system or the peripheral device based on an increase in measured distance between the information handling system and the peripheral device over time or based on sensed data from either the information handling system or the peripheral device, such as data collected from an accelerometer. In some embodiments, the information handling system may determine an alert urgency based on the velocity. For example, if the velocity is greater than a threshold velocity, such as a velocity of two meters per second, the alert urgency may be categorized as high urgency. If the velocity is lower than a threshold velocity, the alert urgency may be categorized as low urgency. In some embodiments, a distance between the electronic device and the peripheral device may also be used in determining an alert urgency. For example, if the peripheral device is greater than a second threshold distance from the information handling system, greater than the threshold distance used at step 610, and is moving away at a high velocity, the alert urgency may be categorized as low because the alert will likely be presented to the user too late to remind the user about the forgotten information handling system. If the peripheral device is less than the second threshold distance from the information handling system and is moving away at a high velocity, the alert urgency may be categorized as high because the alert will likely be presented to the user in time to remind the user about the forgotten information handling system.

At step 616, the information handling system may generate an alert based on the determination of which device was moved to exceed the threshold distance. For example, if movement of the information handling system caused the distance threshold to be exceeded, the information handling system may emit a tone via one or more speakers of the information handling system, may display a notification on a display of the information handling system, may cause one or more LEDs to activate, or may generate haptic feedback. If movement of the peripheral device caused the threshold to be exceeded, the information handling system may transmit an instruction to the peripheral device to cause the peripheral device to emit a tone via one or more speakers of the peripheral device, display a notification on a display of the peripheral device, to cause one or more LEDs of the peripheral device to activate, or to generate haptic feedback. In some embodiments, the alert may vary based on the distance between the information handling system and the peripheral device. For example, a volume or pitch of an audio tone emitted by the information handling system and/or peripheral device may increase as the distance increases.

In some embodiments, multiple thresholds may be set, such that when a first threshold distance is exceeded the information handling system may generate a visual alert, such as by flashing an LED or screen of the information handling system and/or flashing an LED or screen of the peripheral device. When a second threshold distance, greater than the first threshold distance, is exceeded, the information handling system may generate an audio alert, such as playing a loud tone on one or more speakers of the information handling system and/or playing a tone on one or more speakers of the peripheral device. When a third threshold is exceeded, the information handling system may generate a messaging alert, causing one or more text messages or email messages to be sent to a user.

In some embodiments, generation of the alert, at step 616, may be based, at least in part, on a determined velocity of either the information handling system or the peripheral device. For example, if an alert urgency, determined based on a velocity of either the information handling system or the peripheral device and/or the distance between the information handling system and the peripheral device, is high, the information handling system may generate, or may cause the peripheral device to generate, a loud tone. If the alert urgency is low, the information handling system may generate or may cause the peripheral device to generate haptic feedback, or may send the user a text message. For example, if a user is beyond a predetermined range of an information handling system or peripheral device, such as a threshold greater than the threshold used to trigger the alert, the information handling system may remain in a sleep mode, and may not wake to alert the user, as described with respect to FIG. 5. The range between the user and the information handling system may, for example, be determined based on a distance between the information handling system and a peripheral device that the user has taken away from the information handling system or based on other data, such as location data from a user smart phone. If a user is within a predetermined range of the information handling system, but a distance between the information handling system and the peripheral device exceeds a threshold range, and the peripheral device is not moving, the information handling system may wake from a sleep state in intervals until enough data is gathered to determine an alert urgency and/or if alert generation is required. In such a situation, the information handling system may increase an interval for checking on a user state, such as determining a distance between the peripheral device and the information handling system, without fully waking from a sleep mode. If a user is within a predetermined range of the information handling system and the peripheral device is moving towards the information handling system, the information handling system may determine that the user is about to use the information handling system and may wake from a sleep state in stages, as the distance between the peripheral device and the information handling system decreases. If the distance between the information handling system and the peripheral device is decreasing rapidly, the information handling system may wake more rapidly, skipping one or more stages in waking from the sleep state. Thus, generation of an alert may be based on a velocity of an information handling system or a peripheral device, in addition to a distance between an information handling system and a peripheral device and/or a determination of which device was moved to cause the distance to exceed the distance threshold.

In some embodiments, the information handling system may cause other devices to display a notification that the threshold has been exceeded. For example, the information handling system may cause a notification to appear on a display of a smart phone, may cause a smart phone to emit a tone, may cause a smart watch to emit a tone, may cause a notification to appear on a display of the smart watch, or may cause the smart phone or smart watch to generate haptic feedback when a distance threshold between the information handling system and a peripheral device is exceeded. In some embodiments, the information handling system may cause an alert to be presented by a third device based on sensor data received from a peripheral device. For example, if a user removes headphones beyond a threshold distance of a laptop computer, the laptop computer may determine a direction of view of the user based on data received from one or more cameras, such as a webcam or a smart phone camera, such as a front facing camera. For example, the information handling system may use eye tracking to determine a direction of view of the user. The information handling system may also use a UPD sensor to determine presence of a user by an wireless device, such as an information handling system or peripheral device. Based on the direction of view of the user, the laptop computer may cause an alert to appear on a device. For example, if the laptop determines that the user is looking at a display, such as a television, the laptop may cause an alert to be displayed on the television. If the laptop determines that the user is looking at a smart phone, the laptop may cause an alert to be displayed by the smart phone, such as by a software or firmware plumbing extension. An alert notification may include information informing the user of a specific device or information handling system that was left behind. In some embodiments, the information handling system may cause alert notifications to occur on multiple devices, such as on both the peripheral device and the information handling system. In some embodiments, alerts may be sent to all connected devices when a threshold distance is exceeded. Thus, an information handling system may alert a user when a distance between the information handling system and a peripheral device exceeds a predetermined threshold.

In some embodiments, the information handling system may transmit an alert to an IT management console when the distance threshold is exceeded. For example, if disassociation between an information handling system and a peripheral device is not allowed, the information handling system may notify a system administrator that the distance threshold has been exceeded.

Figure 7:
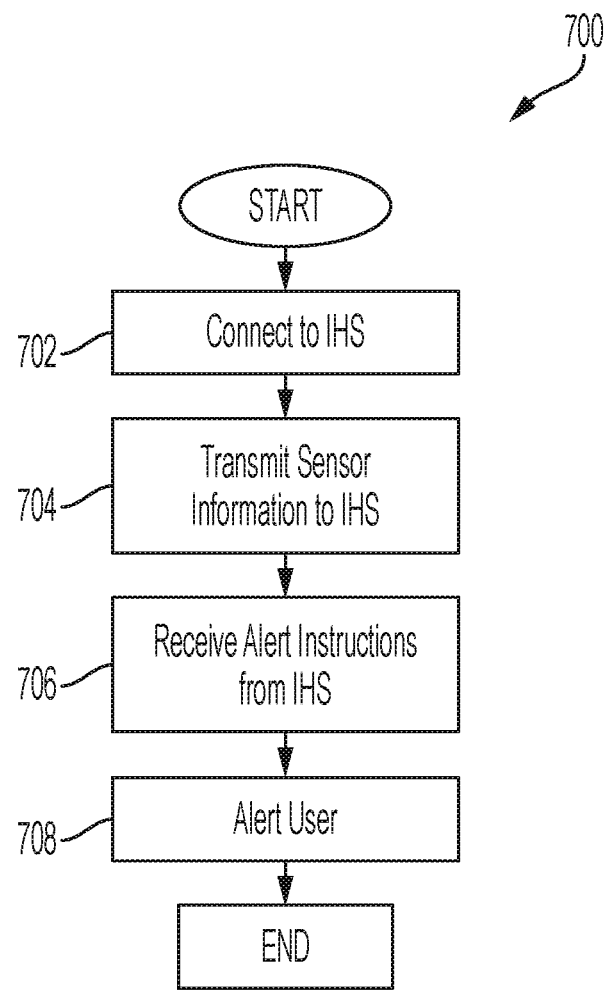
FIG. 7 is a flow chart of an example method for communicating sensed data and alert instructions between an information handling system and a peripheral device according to some embodiments of the disclosure.

A peripheral device may communicate with an information handling system in order to alert a user when a distance between the peripheral device and the information handling system has exceeded a predetermined threshold. An example method 700, of communicating by a peripheral device with an information handling system to alert a user is shown in FIG. 7. The method 700 may begin, at step 702, with connecting, by a peripheral device, to an information handling system. For example, a peripheral device may connect wirelessly to an information handling system, such as by pairing with an information handling system via a Bluetooth LE connection. The peripheral device may also transmit information to the information handling system detailing the alert mechanisms, such as displays, speakers, haptic functionality, and other alert mechanisms present on the peripheral device.

At step 704, the peripheral device may transmit sensor information to the information handling system. The peripheral device may include one or more sensors such as an accelerometer, a gyroscope, a light sensor, a microphone, and other sensors. The peripheral device may collect sensed data from the one or more sensors and may transmit it to the information handling system. However, in some embodiments, a peripheral device may not include sensors and/or may not transmit sensor information to the information handling system.

At step 706, the peripheral device may receive alert instructions from the information handling system. Alert instructions may include instructions to emit one or more tones, display a notification, activate one or more LEDs, generate haptic feedback, or alert a user in some other manner. In some embodiments, the alert instructions may instruct the peripheral device to adjust an alert as the peripheral device moves further from the information handling system. For example, the instructions may instruct the peripheral device to increase the volume of an audio tone or an intensity of a haptic function as the distance increases. For example, when the information handling system determines that a distance between the peripheral device and the information handling system has exceeded a distance threshold, the information handling system may transmit an alert instruction to the user device. In some embodiments, the peripheral device may receive alert instructions from the information handling system when the information handling system also determines that movement of the peripheral device caused the distance threshold to be exceeded.

At step 708, the peripheral device may alert the user. For example, the peripheral device may emit a tone via one or more speakers, display an alert notification on a display, activate one or more LEDs, or generate haptic feedback. In some embodiments, the user device may continue the alert notification until a user enters an acknowledgement of the notification. Alternatively or additionally, the user device may continue the alert notification until the user moves the peripheral device and/or information handling system back within the distance threshold. Thus, a user device may communicate with an information handling system to alert a user when a distance between the user device and the information handling system exceeds a threshold distance.

Figure 5:
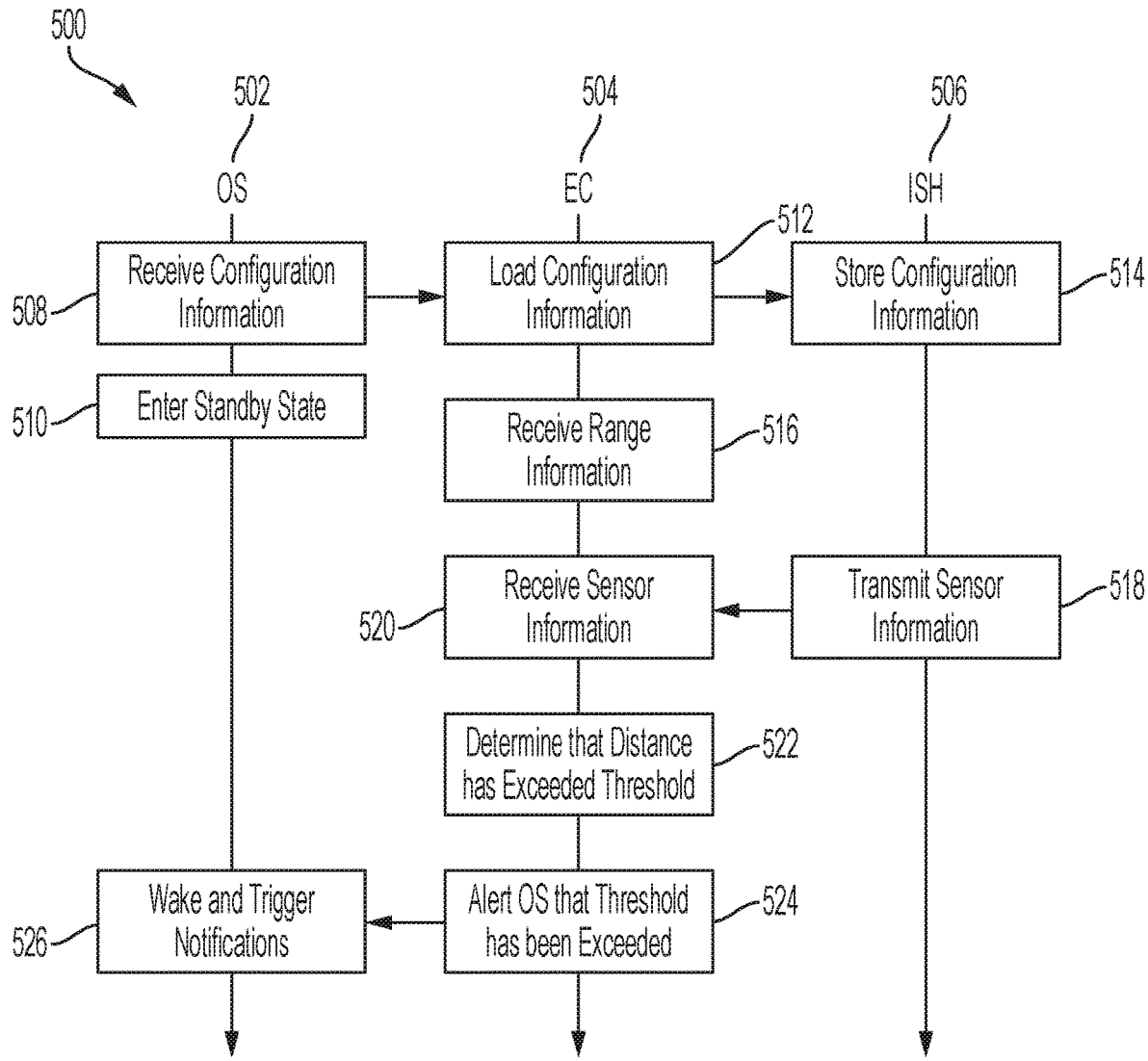
FIG. 5 is a process flow diagram of communication between an embedded controller, an inter-sensor hub, and an operating system of an information handling system according to some embodiments of the disclosure.

The process flow diagram of FIG. 5 and the flow chart diagrams of FIGS. 6-7 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method, comprising:
determining, by a first electronic device, that a distance between the first electronic device and a second electronic device has exceeded a first distance threshold;
determining, by the first electronic device, whether movement of the first electronic device or the second electronic device caused the distance to exceed the first distance threshold by analyzing accelerometer data from at least one of the first electronic device or the second electronic device to determine which of the first electronic device or the second electronic device caused the distance to exceed the first distance threshold; and
generating, by the first electronic device, a user alert on at least one of the first electronic device and the second electronic device based, at least in part, on the determination of whether movement of the first electronic device or the second electronic device caused the distance to exceed the first distance threshold, wherein generating the user alert comprises determining an alert urgency based, at least in part, on a velocity of movement of either the first electronic device or the second electronic device, and wherein generating the user alert comprises generating the alert urgency based, at least in part, on determining that the distance exceeds a second distance threshold and that the velocity of either the first electronic device or the second electronic device exceeds a velocity threshold.

2. The method of claim 1, wherein the step of determining that a distance has exceeded the first distance threshold is performed while the first electronic device is in a standby state.

3. The method of claim 2, further comprising:
monitoring, by an inter-sensor hub of the first electronic device, movement of the first electronic device while the first electronic device is in the standby state,
wherein the step of determining that the distance has exceeded the first distance threshold is performed by an embedded controller of the first electronic device.

4. The method of claim 1, wherein generating the user alert comprises transmitting an alert instruction from the first electronic device to the second electronic device after the first electronic device determines that movement of the second electronic device caused the distance to exceed the threshold.

5. The method of claim 4, wherein transmitting the alert instruction comprises transmitting an instruction for the second electronic device to emit an audible tone, wherein the audible tone increases in volume as the distance between the first electronic device and the second electronic device increases.

6. The method of claim 1, further comprising causing, by the first electronic device, either the first electronic device or the second electronic device to enter a secure mode by revoking a credential for at least one of the first electronic device or the second electronic device based, at least in part, on the determination that the first distance threshold has been exceeded and the determination of whether movement of the first electronic device or the second electronic device caused the first distance threshold to be exceeded.

7. The method of claim 1, wherein determining that a distance between the first electronic device and the second electronic device has exceeded a first distance threshold comprises determining, by the first electronic device, at least one of an angle of arrival or an angle of departure of wireless signals from at least one of the first electronic device and the second electronic device, and the distance is based, at least in part, on the at least one of an angle of arrival or an angle of departure.

8. An electronic device comprising:
an inter-sensor hub coupled to an accelerometer;
an embedded controller coupled to the inter-sensor hub;
a processor coupled to the embedded controller; and
a memory coupled to the processor;
wherein the embedded controller is configured to perform, while the electronic device is in a standby state with the processor in a sleep state, steps comprising:
receiving sensor information from the inter-sensor hub;
determining, based, at least in part, on the sensor information, that a distance between the electronic device and a second electronic device has exceeded a first distance threshold;
determining whether movement of the electronic device or the second electronic device caused the distance to exceed the first distance threshold by analyzing accelerometer data from the accelerometer to determine which of the electronic device or the second electronic device caused the distance to exceed the first distance threshold; and
waking the processor based, at least in part, on the determining that the distance exceeded the first distance threshold, and
wherein the processor is configured to perform, in response to the waking by the embedded controller, steps comprising:
generating a user alert on at least one of the electronic device and the second electronic device based, at least in part, on the determination of whether movement of the electronic device or the second electronic device caused the distance to exceed the first distance threshold, wherein generating the user alert comprises generating an alert urgency based, at least in part, on determining that the distance exceeds a second distance threshold and that a velocity of either the first electronic device or the second electronic device exceeds a velocity threshold.

9. The electronic device of claim 8, wherein generating a user alert comprises transmitting an alert instruction from the electronic device to the second electronic device, after the electronic device determines that movement of the second electronic device caused the distance to exceed the threshold.

10. The electronic device of claim 9, wherein transmitting the alert instruction comprises transmitting an instruction for the second electronic device to emit an audible tone, wherein the audible tone increases in volume as the distance between the electronic device and the second electronic device increases.

11. The electronic device of claim 8, wherein the processor is further configured to perform steps comprising:
causing either the electronic device or the second electronic device to enter a secure mode by revoking a credential for at least one of the electronic device or the second electronic device based, at least in part, on the determination that the first distance threshold has been exceeded and the determination of whether movement of the electronic device or the second electronic device caused the first distance threshold to be exceeded.

12. The electronic device of claim 8, wherein the processor is further configured to perform steps comprising:

determining that a distance between the electronic device and the second electronic device has exceeded a first distance threshold comprises determining at least one of an angle of arrival or an angle of departure of wireless signals from at least one of the electronic device and the second electronic device, and the distance is based, at least in part, on the at least one of an angle of arrival or an angle of departure.

13. The electronic device of claim 8, wherein waking the processor comprises performing an embedded controller interface write to transmit a signal to an operating system service executing on the processor.

14. The electronic device of claim 8, wherein generating the user alert comprises:
generating a low priority user alert based, at least in part, on determining that the distance exceeds the second distance threshold and that the velocity of at least one of the electronic device or the second electronic device exceeds a velocity threshold; and
generating a high priority user alert based, at least in part, on determining that the distance does not exceed the second distance threshold and that the velocity of the at least one of the electronic device or the second electronic device exceeds a velocity threshold.

15. The electronic device of claim 8, wherein generating the user alert comprises:
determining a direction of view of the user, wherein the user alert is generated on at least one of the electronic device and the second electronic device based, at least in part, on the direction of view of the user.

16. A computer program product comprising:
a non-transitory computer readable medium comprising instructions for causing an information handling system to perform steps comprising:
determining, by an embedded controller, that a distance between a peripheral device and the information handling system has exceeded a first distance threshold;
determining, by the embedded controller, whether movement of the information handling system or the peripheral device caused the distance to exceed the first distance threshold by analyzing accelerometer data from at least one of the information handling system or the peripheral device to determine which of the peripheral device or the information handling system caused the distance to exceed the first distance threshold;
waking, by the embedded controller, a processor based, at least in part, on the determining that the distance exceeded the first distance threshold for generating a user alert on at least one of the information handling system and the peripheral device based, at least in part, on the determination of whether movement of the information handling system or the peripheral device caused the distance to exceed the first distance threshold; and
generating, by the embedded controller, an alert urgency based, at least in part, on determining that the distance exceeds a second distance threshold and that a velocity of either the first electronic device or the second electronic device exceeds a velocity threshold.

17. The computer program product of claim 16, wherein the non-transitory computer readable medium further comprises instructions for causing the information handling system to perform steps comprising:
determining the alert urgency based, at least in part, on the velocity of movement of either the information handling system or the peripheral device.

18. The computer program product of claim 16, wherein generating a user alert comprises transmitting an alert instruction from the information handling system to the peripheral device, after the information handling system determines that movement of the peripheral device caused the distance to exceed the threshold.

19. The computer program product of claim 16, wherein instructions for determining that a distance between the first electronic device and the second electronic device has exceeded a first distance threshold comprises instructions for determining at least one of an angle of arrival and an angle of departure of wireless signals from at least one of the information handling system and the peripheral device, and the distance is based, at least in part, on the at least one of an angle of arrival or an angle of departure.

* * * * *